United States Patent [19]
Picard et al.

[11] Patent Number: 6,125,412
[45] Date of Patent: *Sep. 26, 2000

[54] SYSTEM FOR PERFORMING INPUT AND OUTPUT OPERATIONS TO AND FROM A PROCESSOR

[75] Inventors: James A. Picard, San Jose; Morris E. Jones, Jr., Saratoga, both of Calif.

[73] Assignee: Chips & Technologies, LLC, San Jose, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/046,109
[22] Filed: Apr. 9, 1993

Related U.S. Application Data

[63] Continuation of application No. 07/762,630, Sep. 19, 1991, abandoned.

[51] Int. Cl.[7] .................................................. G06F 13/00
[52] U.S. Cl. ............................................................ 710/48
[58] Field of Search .......................... 710/15–21, 36–51, 710/58–61, 260–269; 713/300–340, 500–502

[56] References Cited

U.S. PATENT DOCUMENTS

| | | | |
|---|---|---|---|
| 4,203,153 | 5/1980 | Boyd | 713/323 |
| 4,420,806 | 12/1983 | Johnson, Jr. et al. | 364/200 |
| 4,590,553 | 5/1986 | Noda | 713/320 |
| 4,709,324 | 11/1987 | Kloker | 364/200 |
| 4,757,505 | 7/1988 | Marrington et al. | 371/66 |
| 4,768,149 | 8/1988 | Konopik et al. | 364/200 |
| 4,860,005 | 8/1989 | DeLuca et al. | 340/825.44 |
| 4,930,065 | 5/1990 | McLagan et al. | 364/200 |
| 4,930,068 | 5/1990 | Katayose et al. | 364/200 |
| 4,964,121 | 10/1990 | Moore | 370/311 |
| 5,109,521 | 4/1992 | Culley | 395/800 |
| 5,129,091 | 7/1992 | Yorimoto et al. | 713/323 |
| 5,167,024 | 11/1992 | Smith et al. | 395/375 |
| 5,201,059 | 4/1993 | Nguyen | 713/323 |
| 5,247,164 | 9/1993 | Takahashi | 235/492 |
| 5,274,791 | 12/1993 | Bracking et al. | 711/5 |
| 5,349,688 | 9/1994 | Nguyen | 713/323 |
| 5,392,457 | 2/1995 | Davis et al. | 455/38.3 |
| 5,404,546 | 4/1995 | Stewart | 713/322 |
| 5,406,064 | 4/1995 | Takahashi | 235/492 |
| 5,410,714 | 4/1995 | Yorimoto et al. | 713/323 |
| 5,515,539 | 5/1996 | Ohashi et al. | 713/324 |

*Primary Examiner*—Christopher B. Shin
*Attorney, Agent, or Firm*—D'Alessandro & Ritchie

[57] ABSTRACT

A system for performing input and output operations to and from a processor in which interrupts for I/O operations are conditionally generated internally rather than externally by (Super State™) microcode residing in a separate address space in memory in an area protected from the user. A (superblock) register in the processor points to the Super State area in memory. If the Super State mode is turned on, an interrupt is generated within the processor whenever the control table allows. The interrupt directs the processor to the register and hence to the Super State code. By way of example, the Super State code controls power and access to the port, decides whether to put the interrupt in memory and emulate the I/O, and counts access to the port. The invention provides a processor with the flexibility of performing I/O operations to and from memory and/or to a peripheral or to trap an interrupt into a new operating environment for device emulation. Device emulation and monitoring is allowed without considerable program overhead. The invention provides a powerful, efficient I/O control system which can change or adapt in response the changing demands of an application program.

9 Claims, 1 Drawing Sheet

SYSTEM FOR PERFORMING INPUT AND OUTPUT OPERATIONS TO AND FROM A PROCESSOR

This application is a continuation of application Ser. No. 07/762,630 Filed: Sep. 19, 1991 which is now abandoned.

BACKGROUND OF THE INVENTION

1. Field of the Invention

The present invention relates to computer systems. More specifically, the present invention relates to techniques for effecting power conservation and management in battery powered personal computers.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Power conservation and management is critical for palmtops, laptops and various other battery powered personal computers. The rate of power consumption impacts directly on the length of time the computer may be operated before the batteries must be recharged or replaced. In addition to the inconvenience of changing the batteries, power depletion may occur at a most inopportune time. Accordingly, battery life is a key consideration in the evaluation of competitive products.

Numerous schemes and innovations have been implemented to effect power management. One such scheme involves the automatic powerdown of peripherals (such as a disk drive or a monitor) after a predetermined period of nonuse.

One conventional approach involves the logic implemented through cooperative software and hardware. A separate logic circuit would monitor the line to the peripheral and generate an interrupt to the central processing unit (CPU) which would be effective to disable the device. This approach, however, was difficult to implement. The interrupt had to be protected from or invisible to the user and the user's application software. This approach necessitated considerable additional design and hardware to 1) monitor the peripheral and generate the new interrupt, 2) to recognize the interrupt in the CPU, and 3) to break the flow in the bus from the memory to the processor. In this scheme, thousands of registers and timers are required to monitor the ports and generate the interrupts. The interrupts are always taken. Each time an interrupt is taken a couple hundred instructions are transferred, deciphered and executed. The system is therefore complex and slow.

An alternative scheme involves the assignment of a block of memory for input/output (I/O) operations. The memory is mapped to the I/O ports of the system to which the peripherals are attached. Typically, large adjacent blocks of memory in a high address space are used to which the ports are assigned. The memory provides one bit per port which controls I/O to the port. If the bit is set, I/O is allowed. If not, I/O will not occur but instead will cause an interrupt to occur. Input/output can then be emulated by sending the I/O instruction to memory. (The I/O instruction is a digital word or byte comprised of several bits of digital data. The bits provide the address of the selected I/O port and data to be written to or read from the port.)

In this scheme, power conservation is effected by disabling certain ports due to various factors such as the availability or condition of a peripheral on the machine or a low power state of the battery by way of example. Unfortunately, this method is slow since the interrupt path to the emulation software is typically quite long. Further, I/O managed in this manner also requires that the processor be run in a protected mode to prevent interference from the user's application program. This limits the speed at which the application program can operate.

Thus, there is a need in the art for a technique for managing the input and output operations of a battery powered personal computer to allow high operating speeds with minimal power consumption and minimal additional hardware.

SUMMARY OF THE INVENTION

The need in the art is addressed by the present invention in which interrupts for I/O operations are conditionally generated internally rather than externally by (Super State™) microcode residing in a separate address space in memory in an area protected from the user. A (superblock) register in the processor points to the Super State area in memory. If the Super State mode is turned on, an interrupt is generated within the processor whenever an I/O instruction is received. The interrupt directs the processor to the register and hence to the Super State code. By way of example, the Super State code may be written to control power and access to the port, decide whether to put the interrupt in memory and emulate the I/O, and count access to the port. In the illustrative embodiment, the Super State code includes an I/O read control table, an I/O write control table, an access counter table, memory used for I/O reads and memory used for I/O writes.

The invention provides a processor with the flexibility of performing I/O operations to and from memory and/or to a peripheral or to trap an interrupt into a new operating environment for device emulation. Device emulation and monitoring is allowed without considerable program overhead. The invention provides a powerful, efficient I/O control system which can change or adapt in response to the changing demands of an application program.

BRIEF DESCRIPTION OF THE DRAWINGS

The FIGURE is a simplified block diagram of showing the architecture of a computer employing the teachings of the present invention.

DESCRIPTION OF THE INVENTION

Figure 1:
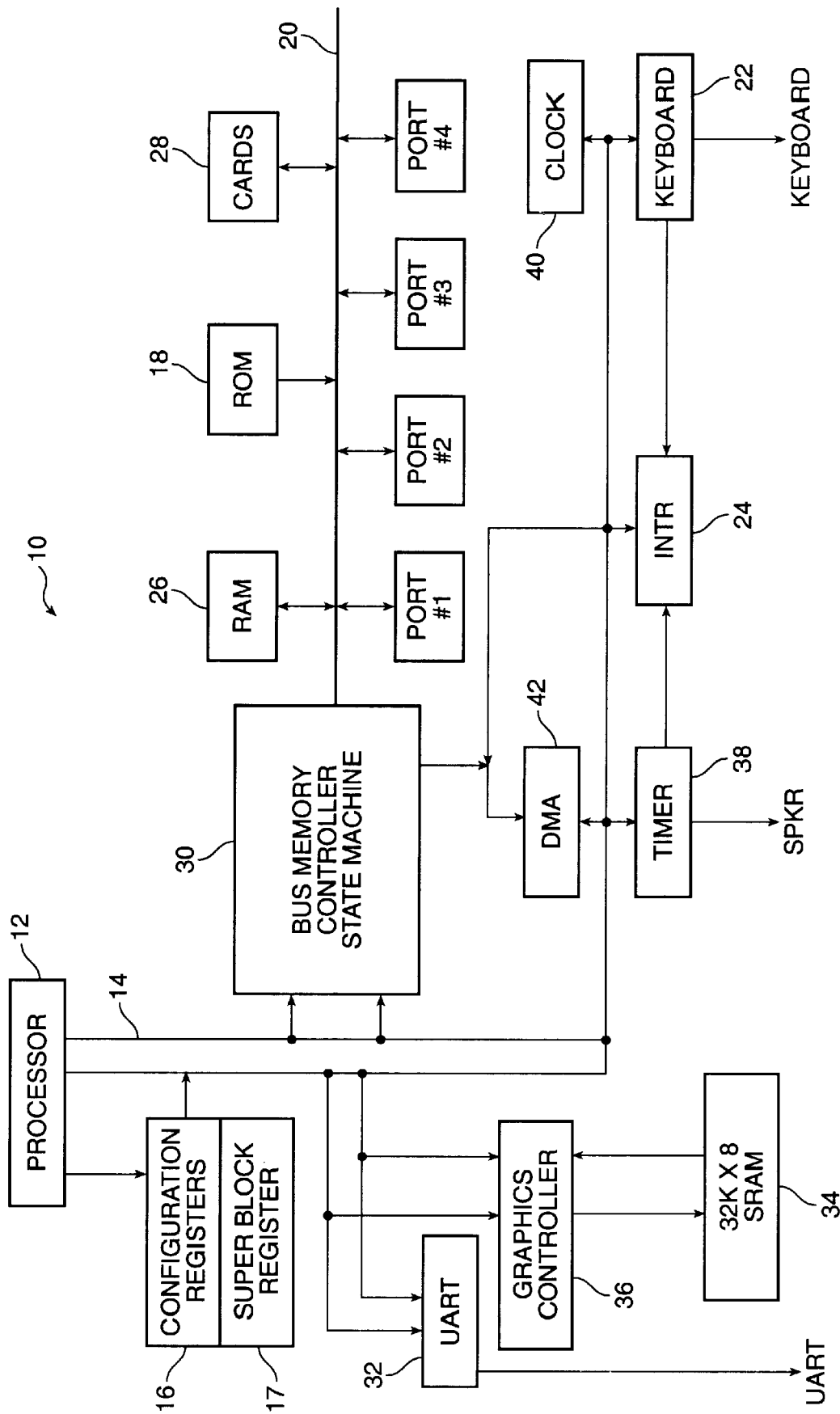

Illustrative embodiments and exemplary applications will now be described with reference to the accompanying drawings to disclose the advantageous teachings of the present invention.

The FIGURE is a simplified block diagram of a computer system 10 including a processor 12 with an internal bus 14. Configuration registers 16 are provided for storing instructions to be executed by the processor 12. Instructions stored in the configuration registers along with code stored in a read-only memory (ROM) 18 and application software provided by a user are interpreted by the processor 12 and used to operate the system 10 to provide desired input and output data. The software provided by the user is provided from a peripheral such as a disk drive (not shown) via an external bus 20 or from a keyboard (not shown) via a keyboard buffer 22 and interpreter 24. A random access memory (RAM) 18 stores data and addresses generated during the execution of programs and routines by the processor 12. The RAM is connected to the system 10 via the external bus 20 as are user provided cards 28. A bus memory controller 30 arbitrates between the internal and external buses 14 and 20 respectively. Numerous other devices common to conventional computers are connected to the internal bus including a universal asynchronous receiver/transmitter (UART) 32, which is essentially a serial I/O port, a block of static RAM 34 connected through a graphics controller 36, a timer circuit 38, clock 40 and direct memory access (DMA) 42. The UART 32 provides a one I/O port while additional parallel I/O ports are illustrated by ports 1–4 connected to the external bus 20. Numerous peripheral devices (not shown) may be connected to the system 10 via the ports including disk drives and other devices.

In a conventional mode of operation, input and output to peripheral devices in a power management regime is effected by monitoring a line to a peripheral and generating appropriate interrupts or effecting memory I/O through a large dedicated protected area in bit mapped memory. The shortcomings of each of these approaches is set forth above.

The shortcomings in prior power management schemes are addressed by the present invention in which interrupts for I/O operations are conditionally generated internally rather than externally specified by memory tables microcode residing in a separate address space in memory in an area protected from the user.

The present invention provides a Super State mode of operation which is an extension to the architecture of the system 10 which allows emulation of I/O devices and provides power management features for battery powered personal computers. ("Super State" is a trademark of Chips and Technologies, Inc. of San Jose, Calif.) The invention adds an additional state to the architecture that does not use the application stack or interrupt vectors. It is intended to be used outside of the conventional 1 mega (Mb) address space of the system 10 or to be placed under the ROM basic input/output system (BIOS) shadow area. The present invention adds several new instructions that are functional only in the Super State mode. These instructions allow entry and exit to super state mode and memory management beyond the 1 Mb limit.

In the preferred embodiment, the Super State mode is entered by one of several means. These include an external Super State interrupt request, a Super State interval timer, protected I/O operations, and DMA assist requests. Super State mode is controlled by a region of memory hereinafter called the "Super State Block". The Super Block is pointed to by a new internal register hereinafter called the Super State Block register 17. See the FIGURE. The Super State Block contains a region and protected mode I/O tables, and virtual intercept tables.

As illustrated in Table I below, the pointer region contains the old and new stack pointers and interrupt vectors.

TABLE I

| Where | What | Description |
| --- | --- | --- |
| 0 | OLD SP | Save area for old stack pointer |
| 2 | OLD SS | Save area for Application Stack Segment |
| 4 | OLD Flags | Save area for flags |

TABLE I-continued

| Where | What | Description |
| --- | --- | --- |
| 6 | OLD DS | Save area for Application Data Segment |
| 8 | OLD CS | Save area for Application Code Segment |
| A | OLD IP | Save area for Application Instruction Pointer |
| C | NEW SP | Super State Stack Pointer |
| E | NEW SS | Super State Stack Segment |
| 10 | NEW DS | Super State Data Segment |
| 12 | NEW CS | Super State Code Segment |
| 14 | NEW IP | Branch Table Index |
| 40 | DMAREGS | The DMA registers |

As illustrated in Table II below, in protected mode I/O table contains several tables. Each table has one entry per I/O address. The tables manage the I/O operations. In the illustrative embodiment, each table is 1024 bytes long. This allows one table entry per I/O address for the first 1024 ports. This allows I/O addressing as on the IBM XT personal computer. The five tables are I/O write control "WCTL", I/O read control "RCTL", I/O activity counter "CNT", I/O write memory data "WMEM", and I/O read memory data "RMEM".

TABLE II

| What | Where | Description |
| --- | --- | --- |
| WCTL | 100 | The I/O write control bits |
| | | 7 = Indexed (Not working yet) |
| | | 6 = Reserved |
| | | 5 = Reserved |
| | | 4 = Reserved |
| | | 3 = Reserved |
| | | 2 = Write Memory |
| | | 1 = Write Port |
| | | 0 = Interrupt After Instruction |
| RCTL | 500 | The I/O read control bits |
| | | 7 = Indexed (Not working yet) |
| | | 6 = Reserved |
| | | 5 = Reserved |
| | | 4 = Write IOR Memory |
| | | 3 = Read IOW memory |
| | | 2 = Read IOR memory |
| | | 1 = Read Port |
| | | 0 = Interrupt |
| CNT | 900 | Port Reference Counter |
| WMEM | D00 | Memory Locations for I/O write |
| RMEM | 1100 | Memory Locations for I/O read |

The I/O read and write control tables contain control bits that indicate what is to happen when the I/O operation is to be performed. The I/O write control is a byte that contains control information for all I/O write operations in the Super State mode. There is one control byte for each of the first 1024 I/O addresses. During an I/O write instruction, the processor first accesses the I/O write control byte for the addressed port. The I/O control bits are present to allow system control over application I/O operations. The control byte contains a bit that indicates if the port is an indexed port, and a second table is needed, a bit that indicates a write to write data memory is to occur, a bit that indicates that an I/O operation is to occur, and a bit that indicates that a Super State interrupt is to occur after the I/O instruction has completed. A single I/O instruction may write memory, write the port, and then initiate an interrupt all during the same instruction, or any combination of the three. If the addressed port is a base port, then a normal external I/O instruction will be performed. It will then see if data is to be written to memory. If so, then the data will be written to memory. If an interrupt is indicated, then it will set up the interrupt vector to the Super State control block. At the end of the instruction, it will increment the activity counter associated with the port.

If an I/O device is powered off, or sleeping, then the I/O control byte can be set to write to memory and signal an interrupt. On receipt of the interrupt by the processor 12, Super State software can turn on the device then write the actual data to the device. The user's application software does not require any changes. If desired, the control byte may be set to allow the port to be written by the application and also written to memory. This allows the Super State software to have an image of all data written to the ports of all peripheral devices for sleep or suspend functions. Appendix A contains an illustrative program used in the present invention to perform the Super State mode input and output operations described herein. The program shown in Appendix A is copyrighted by Chips and Technologies, Inc. of San Jose, Calif. The program in Appendix A was written in the language of 8088 assembly language. Those skilled in the art will be able to design code appropriate for a given application without departing from the scope of the present invention.

The I/O read control is a byte that contains control information for all I/O read operations in Super State mode. There is one control byte for each of the first 1024 I/O addresses. The control byte contains a bit that indicates if the port is an indexed port, implying a second table is needed, a bit that indicates a read from the port is to occur, a bit that indicates a read from the I/O write memory location is to occur, a read from the I/O read memory location is to occur, a bit that indicates that the I/O read memory is to written with the data read, and a bit that indicates if an interrupt is to be initiated after the instruction has completed. A read from one of the three sources may be performed in addition, the I/O read memory area may be written and an interrupt performed in the same instruction.

By reading from the I/O write area, the I/O read instruction will read what was last written to the port if I/O write to memory was enabled on the same port address in the I/O write control byte. Since many devices read different data than they write, an area is provided for I/O read separate from I/O write. The port may be read and the data placed in the I/O read memory. This allows shadowing of the ports for sleep and suspend and resume.

If an I/O device is powered down, status may be placed in the I/O read memory location for the peripheral and the application program will continue to read the status from memory any time it reads the port. This allows hardware level compatibility with software that simply polls a number of devices such as the printer and serial ports in an idle loop. These devices may be powered down and appropriate status placed in the I/O read locations in the I/O read data table.

The I/O activity counter is incremented every time the I/O port is either read or written. This is useful in determining if a device is being used and may be powered down. It is also useful in determining if the software is in an idle loop. In a typical application, the Super State software would be interrupted about once a second via a Super State timer interrupt on each interrupt which would look at the activity counters for devices such as the keyboard, UART, and printer. If the counts are approaching static levels or have not changed, then power savings steps can be taken such as powering off devices, or slowing down the CPU clock.

Several devices in the microcomputer marketplace have what are referred to as index registers. An index register is an I/O port that is written with an address inside the component. Another port is used to write the actual data. In the processor I/O space, these two ports appear as only two ports. In the actual device, many logical ports will be mapped using the address stored in the index register. To facilitate device emulation, the virtual I/O system has what is called an "indexed bit". When the indexed bit is set, it indicates that the port being accessed is the data port for an address/data pair of ports. The MEMW array will hold the address of the internal device port in a secondary table. The CNT, MEMR are considered to be the high 16 bits of a 24 bit address and the MEMW is the offset into the tables for the data ports inside the device. This allows one level of indirection and works well with devices such as graphics controllers.

The Super State code and Super Block register contents are written to a protected area of memory or ROM shadowed. Read/write status of the ROM shadowed area is controlled based on the processor state. This feature is implemented by separate a mechanism.

Thus, when the application program attempts to communicate with a peripheral device through a port, Super State interrupt is activated which causes the processor to jump to the Super Block and enter Super State mode and return. For example, when the BIOS provides an I/O instruction such as:

OUT 24H, AL;

which would mean fill I/O port number 24 with the contents of register AL, in accordance with the present teachings, the processor 1) get the data to be written, 2) read the control byte in the Super State register 17, 3) increment the count for the port, 4) jump to Super State mode, perform the Super State mode operations, and 5) return to normal mode. When and how actual I/O takes place is up to the programmer.

The invention provides a processor with the flexibility of performing I/O operations to and from memory and/or to a peripheral or to trap an interrupt into a new operating environment for device emulation. Device emulation and monitoring is allowed without considerable program overhead. The invention provides a powerful, efficient I/O control system which can change or adapt in response the changing demands of an application program.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system including a microprocessor having a memory, a means for executing a series of instructions, and a plurality of input/output ports each capable of connection to an input/output device, said series of instructions including input and output instructions, the system comprising:

instruction means within said microprocessor for entering a super state mode of operation from a normal mode of operation;

input/output control code stored in said memory beginning at a particular address, said input/output control code for controlling input and output between said microprocessor and said ports;

a super state block register within said microprocessor for storing said particular address;

instruction means within said microprocessor for generating an interrupt each time said microprocessor encounters an input or an output instruction in said series of instructions while in said super state mode, said interrupt causing said microprocessor to access said super state block register and execute said input/output control code.

2. The system of claim 1, wherein said normal mode of operation is a first power consumption mode and said super state mode of operation is a second power consumption mode.

3. The system of claim 1, wherein said memory further comprises input/output tables containing control information indicating when the input/output device should be turned on, said input/output control code controlling access to said control information.

4. The system of claim 3, further comprising:

a port reference counter in said memory, said port reference counter having a count associated with an input/output device, said count being incremented every time the input/output port is either read or written.

5. A method for managing the input and output operations of a battery powered computer, said computer including a microprocessor having a memory, a means for entering a super state mode of operation from a normal mode of operation, a plurality of input/output ports each capable of connection to an input/output device, input/output control code in said memory for controlling power to an input/output device and for controlling input and output between said microprocessor and said ports, and means for executing a series of instructions including input and output instructions, the method comprising:

entering said super state mode of operation from said normal mode of operation;

executing said series of instructions; and generating an interrupt within said microprocessor each time said microprocessor encounters an input or an output instruction in said series of instructions while in said super state mode, said interrupt causing said microprocessor to execute said input/output control code each time said microprocessor encounters an input or an output instruction in said series of instructions.

6. The method of claim 5, wherein said memory further comprises input/output tables containing control information, the method further comprising:

accessing said control information in said input/output tables;

controlling power to an input/output device as indicated by said control information.

7. The method of claim 5, wherein said memory further comprises input/output tables containing control information, the method further comprising:

accessing said control information in said input/output tables;

writing to memory if said instruction is an output instruction and said input/output device is powered off or sleeping.

8. The method of claim 5, wherein said memory further comprises a port reference counter having a count associated with the input/output device, the method further comprising:

incrementing said count every time the input/output port is either read or written; and powering off the input/output device if said count approaches a static level.

9. The method of claim 5, wherein said memory further comprises a port reference counter having a count associated with the input/output device, the method further comprising:

incrementing said count every time the input/output port is either read or written; and slowing down the CPU clock if said count approaches a static level.

* * * * *

UNITED STATES PATENT AND TRADEMARK OFFICE
CERTIFICATE OF CORRECTION

PATENT NO. : 6,125,412
DATED : September 26, 2000
INVENTOR(S) : James A. Picard and Morris E. Jones, Jr.

It is certified that error appears in the above-identified patent and that said Letters Patent is hereby corrected as shown below:

<u>Title page,</u>
Before the first word of the title, insert -- A --.

ABSTRACT,
Line 20, after "response", insert -- to --.

<u>Column 1,</u>
Line 1, before "system", insert -- A --.

<u>Column 2,</u>
Line 47, delete "of".

<u>Column 5,</u>
Line 33, after "to", insert -- be --.

<u>Column 6,</u>
Line 20, replace "by separate a mechanism." with -- by a separate mechanism. --.
Line 32, replace "get" with -- gets --.
Line 32, replace "read" with -- reads --.
Line 33, replace "increment" with -- increments --.
Line 34, replace "jump" with -- jumps --.
Line 34, replace "perform" with -- performs --.
Line 35, replace "return" with -- returns --.

Signed and Sealed this

Twelfth Day of March, 2002

*Attest:*

*Attesting Officer*

JAMES E. ROGAN
*Director of the United States Patent and Trademark Office*